United States Patent [19]
Rault

[11] Patent Number: 5,715,154
[45] Date of Patent: Feb. 3, 1998

[54] CIRCUIT AND METHOD FOR CONTROLLING AN INRUSH CURRENT LIMITER IN A POWER CONVERSION SYSTEM THAT INCLUDES POWER FACTOR CORRECTION

[75] Inventor: Pierre Rault, Saint Cyr Sur Loire, France

[73] Assignee: SGS-Thomson Microelectronics S.A., Saint Genis, France

[21] Appl. No.: 659,420

[22] Filed: Jun. 6, 1996

[30] Foreign Application Priority Data

Jun. 8, 1995 [FR] France ................. 95 07018

[51] Int. Cl.$^6$ .................................................. H02M 5/42
[52] U.S. Cl. ................................................ 363/89; 323/908
[58] Field of Search ............................ 323/908; 363/89

[56] References Cited

U.S. PATENT DOCUMENTS

| | | | |
|---|---|---|---|
| 4,743,835 | 5/1988 | Bosse et al. | 323/266 |
| 5,432,408 | 7/1995 | Matsuda et al. | 315/200 R |
| 5,574,632 | 11/1996 | Pansier | 323/908 |

OTHER PUBLICATIONS

IBM Technical Disclosure Bulletin, vol. 38, No. 3, Mar. 1, 1995, pp. 527–530, IX 000508127 "Circuit To Limit Inrush Current In a Boost and Conventional Switcher".

Proceedings Of The International Conference On Industrial Electronics Control and Instrumentation, Bologna, Sep. 5–9, 1994 Plenary Session Power Electronics, vol. 1 of 3, Sep. 5, 1994 Institute of Electrical and Electronics Engineers, pp. 639–645, Ramesh Oruganti, et al. "A Novel PFC Scheme For AC to DC Converter With Reduced Losses".

IBM Technical Disclosure Bulletin, vol. 25, No. 2, Jul. 1982, New York, US, p. 470, Anonymous, "Power Supply Inrush Current Limiter/Clamp Circuit, Jul. 1982".

*Primary Examiner*—Stuart N. Hecker
*Attorney, Agent, or Firm*—Wolf, Greenfield & Sacks, P.C.; James H. Morris

[57] ABSTRACT

A power conversion circuit for providing a rectified supply voltage to an output capacitor. The power conversion circuit includes: a rectifying circuit; a power factor correction circuit; a resistor for limiting inrush current, the resistor being operatively connected between the rectifying circuit and the power factor correction circuit, the capacitor being connected to the output of this power factor correction circuit; and a switch that is operatively connected for short circuiting the resistor, the output capacitor being connected across the output terminals of the power factor correction circuit, the switch being activated when the output voltage of the power factor correction circuit exceeds a predetermined threshold.

17 Claims, 2 Drawing Sheets

CIRCUIT AND METHOD FOR CONTROLLING AN INRUSH CURRENT LIMITER IN A POWER CONVERSION SYSTEM THAT INCLUDES POWER FACTOR CORRECTION

BACKGROUND OF THE INVENTION

1. Field of the Invention

The present invention relates to a circuit and method for controlling an inrush current limiter in a power conversion system. More particularly, the present invention relates to a circuit and method for controlling an inrush current limiter in a direct-off-line switchmode power conversion system that has pre-regulation circuitry for providing power factor correction.

2. Discussion of the Related Art

FIG. 1 illustrates a basic schematic diagram of a known direct-off-line switchmode power conversion system.

This power conversion system includes: a switch S1, a bridge rectifier DB; a capacitor C1 and a switchmode power converter SPC.

In direct-off-line switchmode power conversion systems, where costs and size are major factors, it is normal practice to use semiconductor rectifiers and a large filter capacitor to supply a high d.c. voltage to the converter SPC.

However, because these systems have such an inherently low input resistance, especially when capacitor C1 is initially discharged, very large peak surge currents flow in the input components, i.e. the switch S1, the rectifier DB, the supply lines (A, B), and the capacitor C1, when the system is connected, via switch S1, to the line input. These large peak surge currents, or inrush currents, are very stressful to these input components. Furthermore, these inrush currents can also cause interference to other equipment and apparatus connected to the same supply.

The power converter SPC is illustrated as having a single pair of output terminals C, D. However, in practice the power converter will have a plurality of output terminals. These output terminals will supply power, that typically have d.c. voltages that are lower than the d.c. voltage at the input to the power converter SPC, to a variety of loads (not illustrated). The applications for such a power converter system are well known and numerous.

It is known by those skilled in the art that inrush current, Ic, can be reduced, i.e. limited, when the supply is switched on by introducing a resistive element or device, in one or more of the supply lines, between the input lines and the capacitor C1. Therefore, by limiting the inrush current the input components avoid being over stressed, and any interference is reduced.

FIG. 2 illustrates a similar basic schematic diagram to that of FIG. 1. However, FIG. 2 also includes a resistive element R1 for limiting the inrush current and a switch S2 for short circuiting the resistive element R1.

The arrangement of R1 and S2 is known by those skilled in the art. Also known is that resistors or NTC thermistors, for example, can be used to limit inrush current and can be situated either in front of, or behind, the rectifier DB.

In this particular illustration, a current limiting resistor R1 and switch S2 are illustrated as being situated on the rectified side of the converter system, i.e. the high voltage d.c. side. Switch S2 can, for example, be implemented by a silicon controlled rectifier SCR, i.e. a thyristor, for example, and again this is known to those skilled in the art.

Switch S2 is controlled by the power converter SPC as illustrated. However, in the case where switch S2 is implemented by a thyristor, for example, additional arrangements have to be made in order to gate or trigger the thyristor into conducting since, the output d.c. voltages of the power converter, i.e. the voltages that can be supplied to the gate of the thyristor, are lower than its d.c. input voltage, i.e. the voltage present on the cathode of the thyristor.

These additional arrangements typically require that a dedicated d.c. output terminal, including all its necessary complex circuitry, is provided for controlling the conduction state of the thyristor. The output voltage from this dedicated d.c. output terminal must be greater than the d.c. voltage at the input terminal, A', of the power converter SPC so that the thyristors p-n junction between its gate and cathode can be forward biased. The forward biasing of the gate-cathode junction allows current to flow through this junction that results in the thyristor turning on; i.e. conducting, thus it is able to shunt the resistor R1 and reduce I2R power loss.

The necessity of these additional arrangements gives rise to a number of problems including: extra components and hence less system reliability; extra costs, especially for wound components, i.e. inductors; greater system weight; larger system size; and greater demands on design efforts.

It is also known to those skilled in the art of power conversion that market interests, which are driven by legislation and/or formal standards, have over recent years been directed to power factor correction PFC. Power factor PF is defined as PF=R/S: where R is the real power and S is the total apparent power. PFC is used as a means for pre-regulating the input power, while at the same time boosting the input d.c. voltage, such that it has an improved PF before the power is converted by a power converter.

There are available on the market today both discrete and integrated solutions for providing PFC. One example of an integrated solution is given in an 1994 application note entitled "DESIGNING A HIGH POWER FACTOR SWITCHING PRE-REGULATOR WITH THE L6560 TRANSITION MODE I.C." by G. COMANDATORE & U. MORICONI both of SGS-THOMSON MICROELECTRONICS. This application note is herein incorporated by reference.

Since there is a strong need, in terms legislation and formal standards, for providing PFC: remembering that the PF correction system provides a d.c. output voltage that is greater than its d.c. input voltage; coupled with the fact that there are inherent problems, as stated above, with switching a thyristor, the present invention proposes a novel solution for providing a power factor corrected power converter system that that can be used to overcome these inherent problems that are associated with inrush current limitation.

OBJECTS & SUMMARY OF THE INVENTION

Accordingly, an object of the present invention is to anticipate overcoming problems that would otherwise be associated with the short circuiting of a inrush current limiting device in a power conversion system that has power factor correction.

Other objects of the present invention include the provision of a circuit and method that anticipate overcoming problems that would otherwise be associated with the short circuiting of an inrush current limiting device in a power conversion system that has power factor correction. The proposed circuit and method are simple and require less components—therefore they are more reliable. The proposed circuit and method do not require any additional inductors neither do they require any dedicated voltages to be produced, and the circuit is more cost effective and easier to design.

Another object of the present invention is to keep the start-up time of the system to a minimum.

Another object of the present invention is to completely avoid any secondary inrush current effect.

In order to achieve these an d other objects, the present invention provides a power conversion circuit, for providing a rectified supply voltage to an output capacitor, that comprises: a rectifying circuit; a power factor correction circuit; a resistive element, for example a resistor, for limiting inrush current, the resistor being operatively connected between the rectifying circuit and the power factor correction circuit; and a switch that is operatively connected and controlled for short circuiting the resistor; the output capacitor is connected across the output terminals of the power factor correction circuit, wherein the switch is activated, i.e. closed, for shunting the resistor when the output voltage of the power factor correction circuit exceeds a predetermined threshold.

According to another embodiment of the present invention, the power factor correction circuit comprises a diode, that is connected between the resistor and the output capacitor, for precharging the output capacitor.

According to another embodiment of the present invention, the power conversion circuit further comprises an input filter capacitor connected across the input terminals of the power factor correction circuit.

According to another embodiment of the present invention, the power factor correction circuit comprises a boost topology switchmode power supply.

According to another embodiment of the present invention, the switch for short circuiting the resistor includes: a silicon controlled rectifier that is operatively connected in parallel with the resistor; and a comparator for activating the conduction state of the silicon controlled rectifier, i.e. for turning the silicon controlled rectifier on.

According to other embodiments of the present invention, the comparator comprises an operatively connected Zener diode, or a plurality of Zener diodes, connected in series with a resistive element, for example a resistor.

According to another embodiment of the present invention, the comparator provides a substantially constant output current.

According to another embodiment of the present invention, the silicon controlled rectifier is a thyristor and/or a triac.

According to other embodiments of the present invention: its output power from the power factor correction circuit is greater than approximately 30 Watts; and/or it is incorporated within a domestic appliance; and/or it is incorporated within an industrial apparatus.

According to another embodiment of the present invention, a method of power conversion is provided, for providing a rectified supply voltage to an output capacitor, that comprises the steps of: rectifying a voltage; limiting inrush current by means of a resistor; precharging the output capacitor, that is connected across the output terminals of a power factor correction circuit, to a voltage that is substantially equal to the rectified voltage; correcting the power factor of the rectified voltage; further charging the precharged output capacitor by means of the power factor correcting circuit; short circuiting the inrush current limiting resistor; wherein the step of short circuiting the inrush current limiting resistor is performed when the voltage stored on the output capacitor exceeds a predetermined threshold.

According to other embodiments of the present invention, methods of power conversion are proposed that: further include the step of charging an input capacitor that is connected across the input terminals of the power factor correction circuit; and short circuiting the inrush current limiting resistor when the input capacitor is fully charged to the rectified voltage and the voltage stored on the output capacitor exceeds a predetermined threshold.

BRIEF DESCRIPTION OF THE DRAWINGS

These and other objects, as well as other advantages and features, of the present invention will become apparent in light of the following detailed description and accompanying drawings among which.

DETAILED DESCRIPTION

Although this invention will be described in connection with certain preferred embodiments, it should be understood that the present disclosure is to be considered as an exemplification of the principles of the invention and that there is no intention of limiting the invention to the disclosed embodiments. On the contrary, it is intended that all alternatives, modifications and equivalent arrangements as may be included within the spirit and scope of the appended claims be covered as part of this invention.

Figure 3:
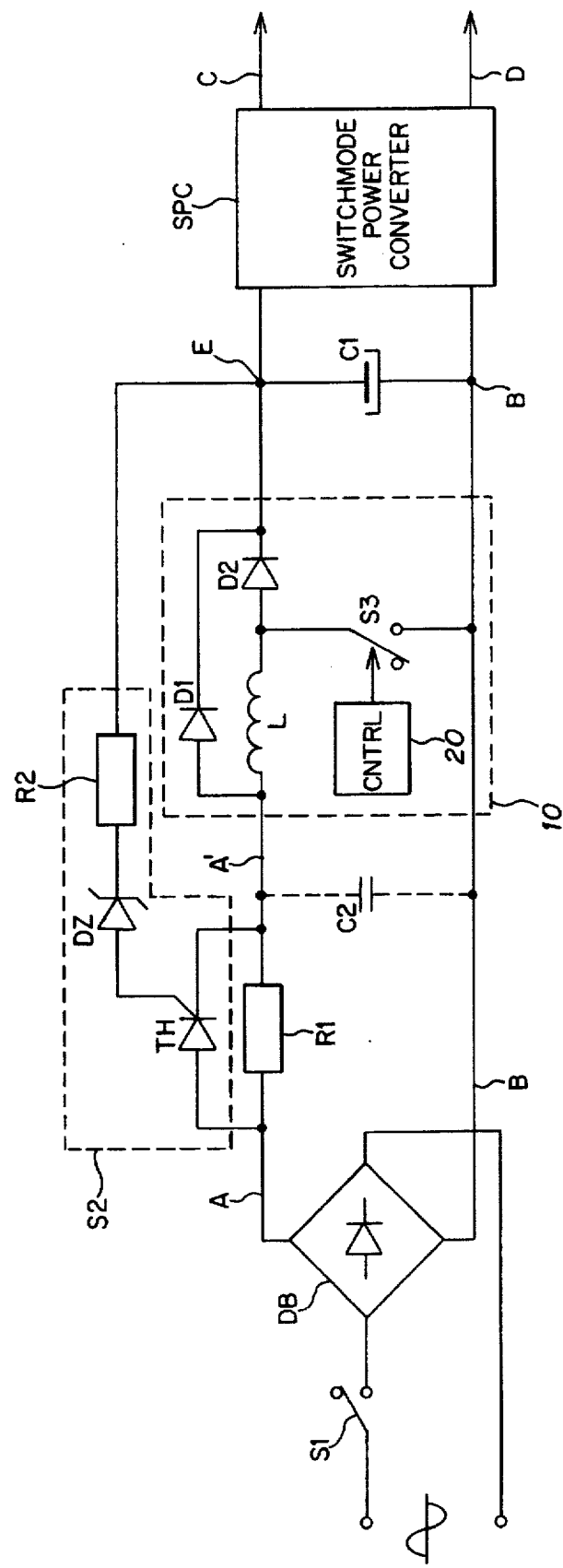
FIG. 3 illustrates a detailed schematic diagram of a direct-off-line switchmode power conversion system according to the present invention.

FIG. 3 illustrates a detailed schematic diagram of a direct-off-line switchmode power conversion system according to the present invention.

Figure 1:
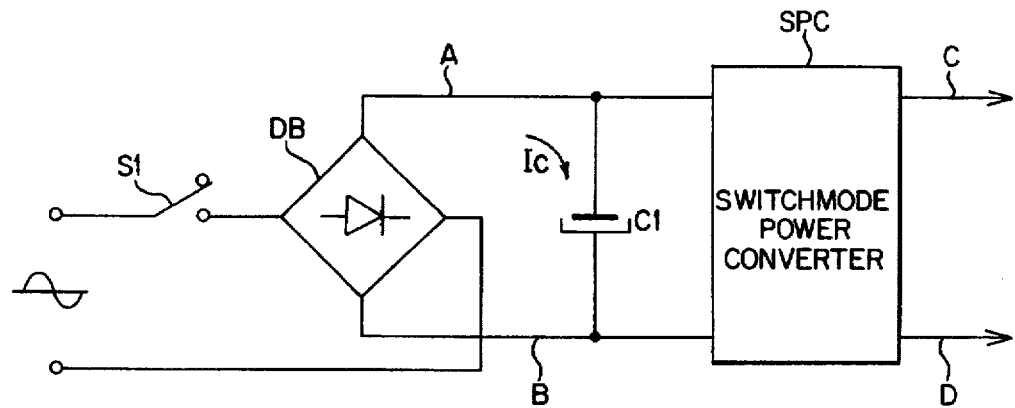
FIG. 1 illustrates an already described basic schematic diagram of a direct-off-line switchmode power conversion system.
Figure 2:
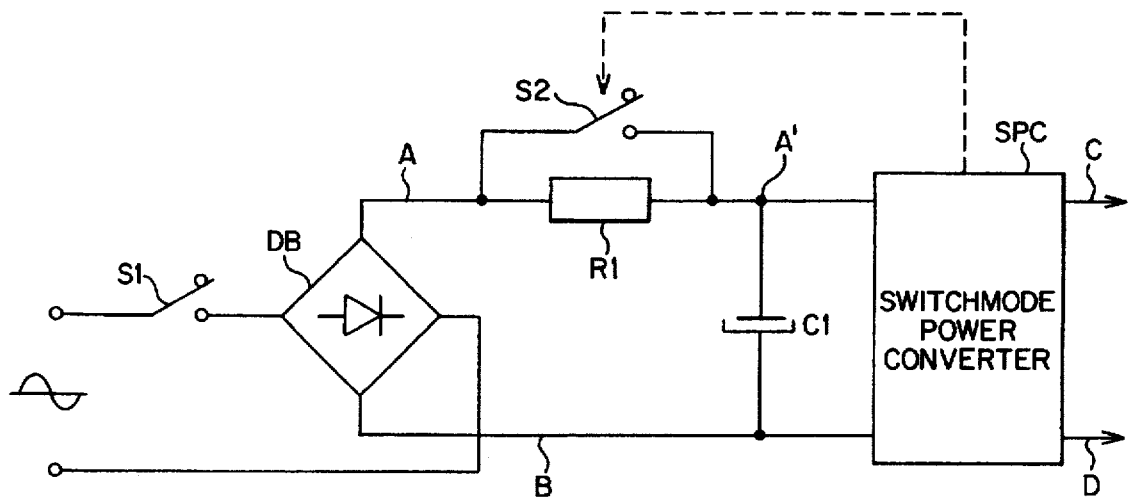
FIG. 2 illustrates an already described basic schematic diagram of a direct-off-line switchmode power conversion system, that is based on that of FIG. 1, that includes an inrush current limiting resistor and a switch for short circuiting the resistor.

This figure illustrates a similar schematic diagram to that of FIG. 2. However, this figure also includes a power factor correction circuit 10 and an optional filter capacitor C2 (illustrated by the dashed lines).

The power factor correction circuit 10, which is typically a boost topology switchmode power supply, is operatively connected between the resistor R1 and the capacitor C1 and includes the following basic elements: two diodes D1, D2; an inductor L; a switch S3; and a control circuit 20. These elements are organized in a manner known to those skilled in the art so that they perform power factor correction PFC. However, diode D1 is a, preferred, optional diode that has been included and whose function will be discussed further on in this text.

In this current figure, switch S2 has been illustrated in more detail and has been shown to include; a thyristor TH; a Zener diode DZ and a resistor R2.

The thyristor is connected in parallel with the inrush current limiting resistor R1 in a known conventional manner. However, the gate of this thyristor is connected to the supply rail E; i.e. the positive output voltage rail of the power factor correction circuit 10, via the series connected Zener diode DZ and resistor R2. The anode and cathode of the Zener diode being respectively connected to the gate of the thyristor and the supply rail E, via resistor R2.

As for the operation of the circuit provided by the present invention, it shall be assumed that: capacitor C2 is not included and diode D1 is included in the this example; that capacitors C1 is completely discharged; and that the thyristor TH is not conducting.

The introduction of resistor R1 increases the inherently low input resistance of the system such that it limits, i.e. reduces, the inrush current into, or through, those components or elements that are susceptible to the effects of inrush current, these components including: the switch S1, the rectifier DB; the power factor corrector 10 (diode D1); and capacitor C1.

According to the present invention, it is preferable, but not mandatory, to include the diode D1 so that the voltage present at the input terminal A' of the power factor corrector 10 can be used to precharge capacitor C1, which is placed across the output terminals E, B of the power factor correction circuit 10, to a voltage substantially equal to that at the terminal A'.

An advantage of including diode D1 is that: the start-up time of the system is kept to a minimum since, the power factor correction circuit 10 only has to charge the capacitor from approximately the voltage value at its input terminal A' to its nominal predetermined output value, for example 400 volts, or in other words, the power factor correction circuit 10 does not have to charge a fully depleted capacitor.

The selection of the value of resistance R1 is usually a compromise between an acceptable peak amplitude of the inrush current and the system start-up delay. A typical value for the resistance R1 is between 10–100 ohms. Incidentally, typical values for capacitor C1 is between 10–100 μFarads, depending of the output power of the converter (the value of C2 can be very low, for example 1 μFarad, and can in fact be omitted).

It should be noted that if C2 is incorporated into the power converter system it is important that the start-up delay is sufficient to allow capacitor C2 to fully charge, via resistor R1, before the power factor correction circuit 10 starts operating. This start-up delay is important because if the power factor correction circuit 10 starts operating before capacitor C2 is fully charged, the load current, i.e. the current into the power factor correction circuit 10, will prevent capacitor C2 from fully charging, so that when the thyristor is activated, i.e. turned on, there will be a further, secondary, inrush current.

However, if C2 is not incorporated into the power converter system, this problem, according to the present invention, will not occur.

The control circuit 20 within the power factor correction circuit 10 initially derives its power from the input terminal A' and after a short delay it will start to operate. This control circuit 20 activates switch S3 so that it conducts current, which allows energy to be stored in the inductor L. When the control circuit deactivates switch S3 so that it no longer conducts current, the energy that is stored in the inductor L is transferred towards capacitor C1. Therefore, capacitor C1 charges.

In the absence of capacitor C2 it should be noted that as soon as capacitor C1 has charged to a voltage value that is approximately equal to, or greater, than the voltage present at terminal A', diode D1 becomes reverse biased. Therefore, when diode D1, and also the inductor L, is reverse biased, there will be no secondary inrush current when resistor R1 is shunted and capacitor C1 is not fully charged.

When the voltage at terminal E is approximately greater than the breakdown voltage VZ of the Zener diode DZ and the p-n junction forward bias voltage between the gate and cathode of thyristor TH, a current will flow from terminal E to terminal A' that will cause the thyristor to trigger into its low voltage drop conduction state. Therefore, resistor R1 will be shunted by thyristor TH and the I2R losses will be dramatically reduced, which will result in increased efficiency.

The breakdown voltage VZ of the Zener diode DZ and the value of the resistance R2 are chosen so as to reduce as much as possible the power that is dissipated in the gate triggering circuitry, i.e. E, R2, DZ, gate-cathode of TH, A'. Therefore, the voltage drop across resistor R2 and the Zener diode can be between 100–200 volts for example, since the voltage at A' decreases to zero volts at each half cycle.

It is possible, but less preferable, to use a plurality of Zener diodes that are operatively connected in series.

It is also possible to replace the Zener diode with another comparator element, that can have for example a constant output current stage, so as to achieve the same result. However, a Zener diode solution is a preferred solution because of its simplicity.

A power conversion system according to the present invention can be applied equally to low power applications, i.e. from approximately 30–150 Watts, or high power applications, i.e. from approximately 150 Watts to several KWatts. These applications can be used for domestic appliances or for industrial apparatus.

Some domestic and industrial application examples, that are not intended to be exhaustive, in which the present invention can be used include: televisions, video recorders, hi-fi's, personal computers, refrigerators, washing machines, air conditioning units, lighting, domotics, robotics, motor control etc.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

I claim:

1. A power conversion circuit for providing a rectified supply voltage to an output capacitor, the power conversion circuit comprising:

a rectifying circuit;

a power factor correction circuit;

said output capacitor being connected across output terminals of the power factor correction circuit;

a resistor for limiting inrush current, the resistor being operatively connected between the rectifying circuit and the power factor correction circuit;

a thyristor that is operatively connected in parallel with the resistor; and means for comparing output and input voltages of the power factor correction circuit and for activating a conduction state of said thyristor when a difference between the output voltage and the input voltage exceeds a predetermined threshold;

wherein said comparing means comprise at least one Zener diode connected between the output of the power factor correction circuit and a gate of the thyristor.

2. The power conversion circuit according to claim 1, wherein the power factor correction circuit comprises a switch means connected between said resistor and said output capacitor for precharging said output capacitor.

3. The power conversion circuit according to claim 2, wherein said switch means is a diode.

4. The power conversion circuit according to claim 1, further comprising an input capacitor connected across input terminals of the power factor correction circuit.

5. The power conversion circuit according to claim 1, wherein output power of the power factor correction circuit is greater than approximately 30 Watts.

6. The power conversion circuit according to claim 1, incorporated within a domestic appliance.

7. The power conversion circuit according to claim 1, incorporated within an industrial apparatus.

8. A method of power conversion, for providing a rectified supply voltage to an output capacitor, the method comprising the steps of:

rectifying a voltage;

limiting inrush current by means of a resistor;

precharging the output capacitor, connected across output terminals of a power factor correction circuit, to a voltage that is substantially equal to the rectified voltage;

correcting a power factor of the rectified voltage;

further charging the precharged output capacitor by means of the power factor correction circuit; and short circuiting the inrush current limiting resistor when a voltage stored on the output capacitor exceeds by a predetermined threshold an input voltage of the power factor correction circuit, wherein the step of short-circuiting the inrush current limiting resistor includes:

coupling a thyristor in parallel with the inrush current limiting resistor; and coupling the voltage stored on the output capacitor through a Zener diode connected to a gate of the thyristor.

9. The method of power conversion according to claim 8, further including the step of charging an input capacitor that is connected across input terminals of the power factor correction circuit.

10. The method of power conversion according to claim 9, wherein the step of short circuiting the inrush current limiting resistor is performed when the input capacitor is fully charged to the rectified voltage and the voltage stored on the output capacitor exceeds a predetermined threshold.

11. A circuit for providing a rectified supply voltage, comprising:

a rectifying circuit;

a power factor correction circuit having first and second output terminals;

an output capacitor connected across the first and second output terminals;

a first resistor connected between the rectifying circuit and the power factor correction circuit;

a thyristor connected in parallel with the first resistor; and a first Zener diode having an anode connected to a gate of the thyristor and a cathode coupled to the first output terminal.

12. The circuit as recited in claim 11, further comprising:

an input capacitor connected across first and second input terminals of the power factor correction circuit.

13. The circuit as recited in claim 11, further comprising:

a second resistor connected between the cathode of the first Zener diode and the first output terminal of the power factor correction circuit.

14. The circuit as recited in claim 11, wherein:

the first resistor has a value in a range of 10–100 ohms; and the output capacitor has a value in a range of 10–100 µFarads.

15. The circuit as recited in claim 11, wherein the power factor correction circuit comprises:

a diode having an anode connected to the first input terminal and a cathode connected to the first output terminal.

16. The circuit as recited in claim 15, wherein the power factor correction circuit further comprises:

an inductor having a first lead connected to the first input terminal; and a second diode having an anode connected to a second lead of the inductor and a cathode connected to the first output terminal.

17. The circuit as recited in claim 15, further comprising:

an input capacitor connected across the first and second input terminals of the power factor correction circuit.

* * * * *